June 24, 1947. J. A. ROLLER 2,422,929
WEED REMOVER
Filed July 21, 1945
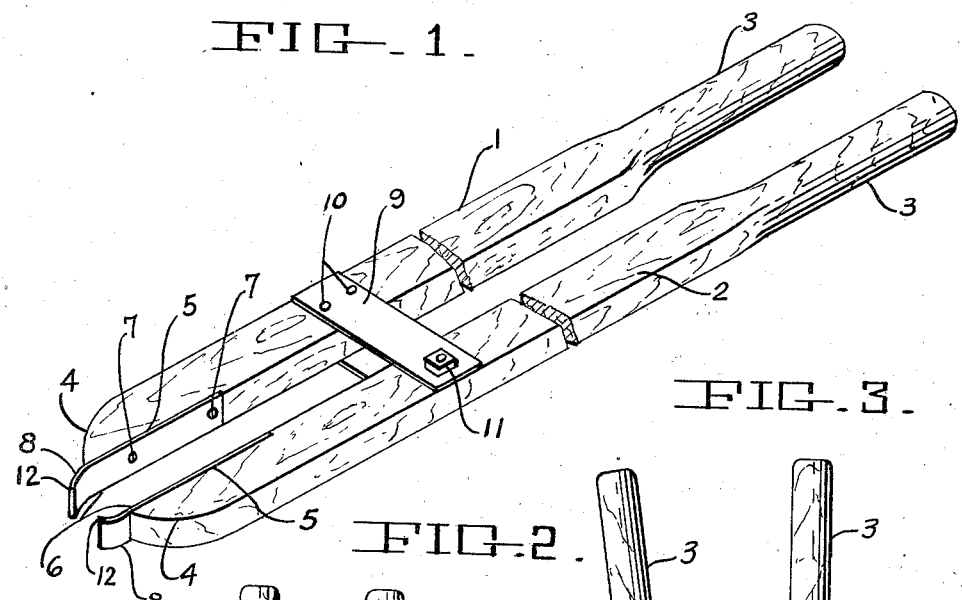
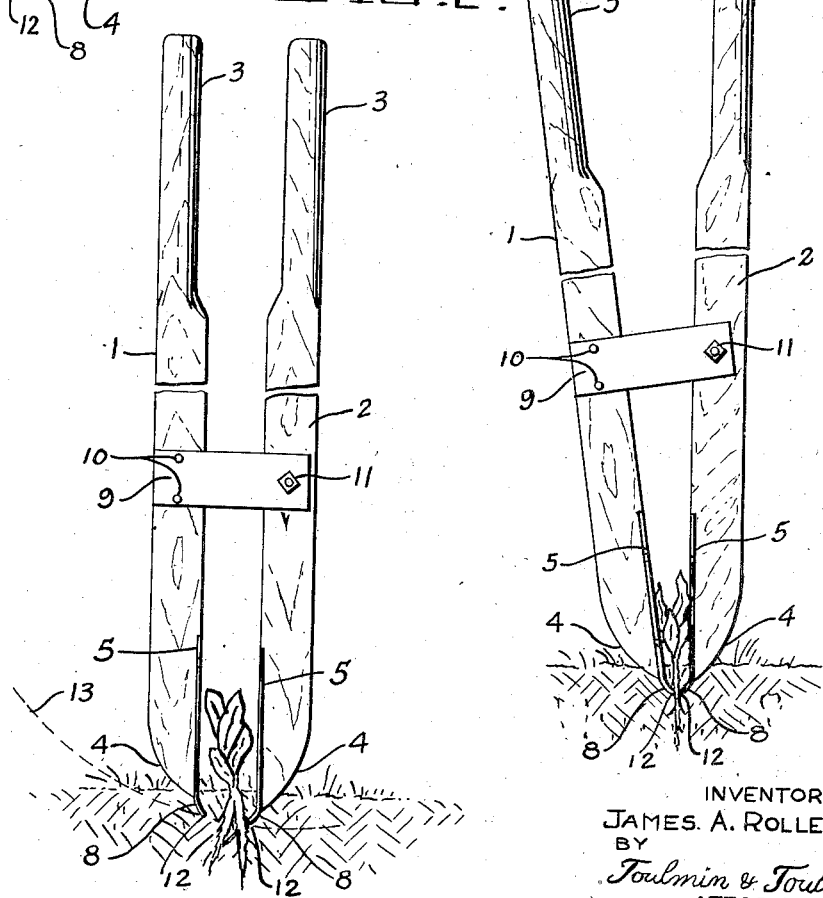
INVENTOR
JAMES. A. ROLLER
BY
Toulmin & Toulmin
ATTORNEYS Patented June 24, 1947

2,422,929

UNITED STATES PATENT OFFICE 2,422,929

WEED REMOVER

James A. Roller, Dayton, Ohio

Application July 21, 1945, Serial No. 606,386

1 Claim. (Cl. 294—50.8)

The present invention relates to weed pulling implements of a type especially intended for pulling weeds or other objectionable plant growth in lawns, gardens, etc.

The main object of my invention is to provide a weed puller of an efficient type which may be used by an operator without having to stoop over.

Another object is to provide a device of this character which can readily pull weeds without damage or interference with closely positioned useful plants.

Still another object is to provide a device for removing weeds and extraneous plant growth without having to pick-up any appreciable amount of soil or dirt.

Another object is to provide a device of this character which can bodily remove weeds having long or widely distributed roots and in which the pulling device grasps all parts of the root without severing, so as to remove the entire weed including all root portions.

These objects are attained in brief by providing a pair of arms terminating in grasping but non-severing jaws, the arms being so hinged that when they are moved apart at the top, one of the jaws describes a descending arc to register with the companion jaw in a clamping position. Consequently, in operation, it is necessary only to insert by a pushing effect one of the jaws into the ground to the required depth position as the other jaw is caused to move to the same position by a swinging effect initiated by spreading the arms of the device apart. Further objects and features will be apparent as the specification is perused in connection with the accompanying drawings in which:

Figure 1 represents a perspective view of the improved weed puller.

Figure 2 shows the first position of the pulling device as it is inserted into the ground and prior to the actual grasping of the root of the weed.

Figure 3 shows the manner in which the device is operated in order to grasp the deeply positioned root of a weed preparatory to removing the weed from the soil.

In the drawings, reference characters 1 and 2 designate respectively two long arms, preferably made of wood for lightness, and terminating in a pair of round handle portions 3. The arms 1 and 2 have a rectangular cross section, for reasons explained presently, and can be made of ash or oak although even a softer wood such as pine can be used to advantage. The ends of the arms opposite from the handle 3 are curved, as indicated at 4, and there is a sawed-down portion 5 extending along the inner sides of the bars for an appreciable length. A pair of metal straps 6, having a width comparable to that of the bars, may be screwed, as indicated at 7, to the recessed bar portions, these straps being preferably made of metal and having a thickness such as to be rendered quite rigid. The strap members 6 extend for approximately one inch or one and one-half inches beyond the curved portions of the bars and terminate in curvilinear ends 8 which extend toward one another.

The bars 1 and 2 are swivelly connected together through a pair of oppositely disposed metal straps 9, preferably positioned at about seven or eight inches along the bars 1, 2 away from the metal jaws 8. These straps are securely attached as by riveting, indicated at 10, to the bar 1 but are swivelly secured to the bar 2 preferably by means of a bolt and nut, indicated at 11. Thus, as the handle of the upper bar shown in Figure 1, is maintained stationary, the lower bar can be caused to swing at the bolt 11 and can therefore be moved toward or away from the handle of the other bar. The straps 9 are preferably made of iron, galvanized if desired, and are sufficiently thick to be rendered quite rigid. The straps may have a width of approximately one and one-quarter inches so as to hold the bars 1 and 2 in line in both the horizontal and vertical directions. The straps may have a length such as to position the bars approximately one and one-half inches apart which has been found in practice to be the proper distance in the event that the wooden bars 1, 2 have a length of approximately two and one-half feet.

The left hand or curved ends of the jaw portions 5 are tapered to a slight extent, as indicated at 12, but are not sufficiently sharp to constitute a cutting edge, the taper being provided merely to concentrate the grasping force or effect along the line of contact.

In operation, the weed puller is grasped by both hands of the operator at the handle portions 3 and placed in a vertical position directly above the weed. The arms of the device are preferably placed in a parallel position, as indicated in Figure 2, in case the weed is not particularly large although if desired, the handle portions 3 can be brought together in order to spread the curved portions 8 of the jaws far apart sufficiently to clear the plant to be pulled. The bar portions 1 and 2 are then pushed into the ground by operating the handles 3 and it will be noted that the jaw of the bar 2 extends slightly below the corresponding jaw of the bar 1 so that the latter need not be inserted quite as deep as the other jaw. This tends to reduce the amount of pressing action necessary on the bars to position the device sufficiently deep in the ground as to surround the roots of the unwanted plant or weed.

As shown in Figure 3, the next step is to move the handle portions 3 as far apart as possible and practically the entire movement will take place at the bar 1, this in turn causing the jaw portion of that bar to swing through a downwardly descending arc, indicated by the dash lines 13, until the jaw of the bar 1 comes into contact with the root of the plant which has been temporarily supported during this procedure by the jaw of the opposite bar member.

While the hand still grasps the handle portions 3, the weed puller is given an upward pull out of the ground, and during withdrawal, will carry with it not only the foliage or leafy portions of the weed but also all parts of the root. An examination of Figure 2 will show that considerable spread can be obtained between the jaw portions 5 by manipulating the handles 3 so that these jaws can be caused to surround all of the roots of the weed even though such roots extend in many directions and are widely distributed. This large spread between the bar members at the weed pulling position also permits the device to encompass all of the leafy portions of the weed, regardless of the size of this portion so as not to mash the leaves which might in turn cause these leaves to fall off and become deposited in the soil. Thus, the improved device is designed to remove the weeds bodily, including all portions of the root and without knocking off any of the leaves which in the case of certain plants such as poison ivy might be quite undesirable. The fact that only one of the jaws 5 is required to be inserted into the ground to the full depth in order to grasp the deep-seated roots makes it quite easy and less exhaustive to use a weed puller of the character described. The work required in operating the device is even made less arduous by reason of the fact that the handles 3 can be grasped in both hands so that any amount of force can be readily exercised without too much effort in case the weed is of considerable size and has unusually deep-seated roots.

I have obtained excellent results with my improved weed puller in removing buckshorn, plantain, dandelion, creeper, crab grass and other noxious weeds from lawns, flower and vegetable gardens. It has been found that when weeds are closely interspersed among useful plants, such weeds cannot be readily removed without contact or other damage with the immediate surrounding plants. Moreover, the minimum amount of soil is also removed with the weed due to the fact that the jaws 5 are not wide and therefore do not encompass a large mass of the soil.

While I have described my improved weed puller from the standpoint of employing wood for the bars or beams 1, 2 in the interests of expense, I may make the entire device out of a lightweight metal such as aluminum or indeed the bars 1 and 2 could be made out of sheet metal bent to a closed rectangular configuration so as to still further lighten the device.

It is apparent that the device is quite inexpensive to manufacture since it involves only the simplest of parts, namely, the bars 1, 2; the jaws 5 and the straps 9, together with the bolt 11.

It will be understood that I desire to comprehend within my invention such modifications as come within the scope of the claim.

Having thus fully described my invention, what I claim as new and desire to secure by Letters Patent, is:

A weed puller comprising a pair of rigid arms of substantially equal lengths and adapted to be grasped by both hands of the operator and provided at the weed pulling end with a pair of jaws which extend beyond said arms and having inwardly curved tips, and a pair of straps positioned respectively on opposite sides of the arms, said straps being rigidly secured to one of the arms and swivelly secured to the other of the arms, one of said jaws being adapted to be inserted into the ground as far as the root of the weed and the other of the jaws being adapted to be swung through a descending arc to meet the other jaw on the opposite side of the root when the upper ends of the arms are spread apart, said jaws being adapted to contact one another at their curved tips and having a constant width as far as said tips, of substantially the same size as the thickness of said arms.

JAMES A. ROLLER.

REFERENCES CITED

The following references are of record in the file of this patent:

UNITED STATES PATENTS

| Number | Name | Date |
| --- | --- | --- |
| 283,282 | Rogers | Aug. 14, 1883 |
| 397,383 | Nivison | Feb. 5, 1889 |
| 429,328 | Webb | June 3, 1890 |
| 774,293 | Tregellas | Nov. 8, 1904 |
| 938,759 | Greene | Nov. 2, 1909 |
| 1,876,907 | Geibel | Sept. 13, 1932 |
| 1,895,214 | Stork | Jan. 24, 1933 |